(12) United States Patent
Houben

(10) Patent No.: US 7,284,842 B2
(45) Date of Patent: Oct. 23, 2007

(54) APPARATUS AND METHOD FOR PRINTING A FLUID MATERIAL BY MEANS OF A CONTINUOUS JET PRINTING TECHNIQUE

(75) Inventor: René Jos Houben, Eindhoven (NL)

(73) Assignee: Nederlandse Organisatie voor toegepast-natuurwetenschappelijk Ondersoek TNO, Delft (NL)

( * ) Notice: Subject to any disclaimer, the term of this patent is extended or adjusted under 35 U.S.C. 154(b) by 193 days.

(21) Appl. No.: 10/525,314

(22) PCT Filed: Aug. 22, 2003

(86) PCT No.: PCT/NL03/00595

§ 371 (c)(1),
(2), (4) Date: Feb. 22, 2005

(87) PCT Pub. No.: WO2004/018212

PCT Pub. Date: Mar. 4, 2004

(65) Prior Publication Data

US 2006/0164469 A1    Jul. 27, 2006

(30) Foreign Application Priority Data

Aug. 22, 2002  (NL)  .................................  1021319

(51) Int. Cl.
*B41J 2/02*  (2006.01)

(52) U.S. Cl. ........................................................ 347/73
(58) Field of Classification Search .................. 347/73, 347/74, 82, 54, 68, 70
See application file for complete search history.

(56) References Cited

U.S. PATENT DOCUMENTS 6,575,564 B1 *  6/2003  Tsuchiya et al. ............... 347/70
6,874,870 B2 *  4/2005  Ishikawa et al. ............... 347/68

* cited by examiner

*Primary Examiner*—K. Feggins
(74) *Attorney, Agent, or Firm*—Michaelson & Associates; Peter L. Michaelson

(57) ABSTRACT

The invention relates to an apparatus for printing a fluid material by means of a continuous jet printing technique, comprising a reservoir for storing the material, a channel connected with the reservoir, which is provided with at least one outflow opening from which, in use, flows a jet of the material breaking up into drops, and a pressure regulating mechanism for varying the pressure of the material upstream of the outflow opening for the purpose of obtaining drops, the apparatus comprising pressure generating means for passing the material under a predetermined pressure through the channel in the direction of the outflow opening, which pressure generating means are arranged for applying the predetermined pressure to the material in the channel hydraulically and/or pneumatically.

21 Claims, 2 Drawing Sheets

APPARATUS AND METHOD FOR PRINTING A FLUID MATERIAL BY MEANS OF A CONTINUOUS JET PRINTING TECHNIQUE

The invention relates to an apparatus for printing a fluid material by means of a continuous jet printing technique, comprising a reservoir for storing the material, a channel connected with the reservoir, which is provided with at least one outflow opening from which, in use, flows a jet of the material breaking up into drops, and a pressure regulating mechanism for varying the pressure of the material upstream of the outflow opening for the purpose of obtaining the jet breaking up into drops, the apparatus being provided with pressure generating means for passing the material under a predetermined pressure through the channel in the direction of the outflow opening.

In this connection, by a continuous jet printing technique is meant the continuous generation of drops which can be utilized selectively for the purpose of a predetermined printing process. The supply of drops takes place continuously, in contrast to the so-called drop-on-demand technique whereby drops are generated according to the predetermined printing process.

The apparatus referred to is known from practice. The known apparatus is described, for instance, in U.S. patent specification U.S. Pat. No. 5,969,733. This document discloses a so-called continuous jet printer for printing materials comprising viscous fluids. With this printer, viscous fluids can be printed. To that end, using the pressure generating means, the viscous fluid is adjusted to a working pressure of up to 8 bars and passed through the channel to the outflow opening. Next, the viscous fluid exits through the outflow opening. During the exit of the viscous fluid, the pressure regulating mechanism provides, with a predetermined regularity, variations in the pressure of the viscous fluid adjacent the outflow opening. This leads to the occurrence of a disturbance in the fluid jet flowing out of the outflow opening. This disturbance leads to a constriction of the jet which in turn leads to a breaking up of the jet into drops. This yields a continuous flow of egressive drops with a uniform distribution of properties such as dimensions of the drops. As a very rough indication, it can be specified that the pressure regulating mechanism needs to have a pressure regulating range of about ten percent of the average working pressure prevailing in the channel. The working pressure of maximally 8 bars is typically generated with the aid of a plunger pump or a centrifugal pump.

A disadvantage of the known apparatus is that at a higher working pressure the working pressure is exerted non-uniformly, thereby already introducing a variation in the working pressure. This leads to the formation of unequal drops in the jet breaking up into drops.

It is an object of the invention to meet the disadvantage mentioned. To that end, the invention provides an apparatus which is characterized in that the pressure generating means are arranged for applying the predetermined pressure to the material in the channel hydraulically and/or pneumatically. Hydraulically is understood to mean: using a liquid; and pneumatically is understood to mean: using a gas. Through the ability to apply the defined pressure to the fluid material in the channel utilizing a gas and/or a liquid, a fluid material can be passed through the channel in the direction of the outflow opening in a stable manner at a very high pressure, much higher than 8 bars.

The uniformity of the drops in the jet breaking up into drops, also at higher working pressures, is only dependent on the pressure regulating mechanism instead of being dependent on both variation in the working pressure and the variation resulting from the pressure regulating mechanism. The apparatus according to the invention enables the continuous printing not only of viscous fluids, but also of other materials that are fluid, or can be rendered fluid, in contrast to the known apparatus which can only print viscous fluids continuously when these viscous fluids can be passed through the channel at a working pressure of 8 bars at a maximum. The use of an apparatus according to the invention also permits of new applications such as Rapid Prototyping.

An embodiment of an apparatus according to the invention is characterized in that the pressure generating means comprise a gas source coupled to the reservoir and/or the channel via a gas connection. With the gas source, the viscous fluid in the channel can be adjusted to both a high and at the same time a constant pressure of for instance 200 bars [$\equiv 200 \cdot 10^5$ Pa]. It is important that the pressure be as constant as possible, because in the event of irregular pressure fluctuations the viscous fluid cannot be passed through the channel and through the outflow opening in a sufficiently gradual manner. Such irregular pressure fluctuations have as a consequence that the quality of the printed result is insufficient.

By virtue of the high pressure, it is possible to print fluids having a particularly high viscosity such as, for instance, viscous fluids having a viscosity of $300 \cdot 10^{-3}$ Pa·s when being processed. Possible new substances are, for instance, viscous polymers such as thermoplasts which may or may not be provided with fillers such as ceramic and particular pigments. With the apparatus according to the invention, such viscous substances can be used for, for instance, printing three-dimensional objects according to a Rapid Prototyping approach. Also light-emitting polymers and dispersions (water with particles therein; slurries, etc.) can be printed continuously with such an embodiment. It is now also possible for dispersions with a filling degree of 20-30 weight percent to be printed continuously.

An embodiment of the apparatus according to the invention is characterized in that the gas source comprises a gas bottle.

A preferred embodiment of the apparatus according to the invention is characterized in that the apparatus is further provided with a plunger pump connected with the gas bottle via a gas connection with a cock, for pressurizing the gas bottle, and that the gas bottle is connected via a cock with the reservoir and/or the channel. The gas bottle here functions as a buffer. The gas bottle serves for building up the above-mentioned pressure in the channel, while the flow rate of the gas flowing out of the gas bottle can be relatively low. This means inter alia that the gas bottle can be made of relatively small design. After the pressure in the gas bottle has fallen during use, the gas bottle can again be adjusted to a desired pressure with the aid of the plunger pump. For this purpose, the cock in the connection between the plunger pump and the gas bottle is opened, while the connection between the gas bottle and the reservoir/channel can be closed. Since the gas bottle may be relatively small, it is possible to realize a practical compact embodiment of the apparatus.

A preferred embodiment of the apparatus according to the invention is characterized in that the gas source comprises a second gas bottle coupled to the reservoir and/or the channel via a gas connection with a cock. The second gas bottle may be coupled to the plunger pump or to a second plunger pump. According to this embodiment, one of the gas bottles can be used for adjusting the channel to, and keeping the channel at, a required pressure, while the other gas bottle, adjusted to a desired pressure, is ready to take over this task. Thus, the apparatus can function without interruption. Optionally, the cocks can be driven by an automatic control system.

In particular, the predetermined pressure is a pressure between 15 and 600 bars.

An embodiment of the apparatus according to the invention is characterized in that the pressure regulating mechanism comprises a movable control pin, which control pin can be moved in a longitudinal direction towards/away from the outflow opening, so that an end of the control pin can be placed at a predetermined distance, for instance in the distance interval of 15-500 μm, from the outflow opening, for varying the pressure adjacent the outflow opening. In use, the control pin vibrates with the desired drop frequency for varying the pressure adjacent the outflow opening. The control pin is situated, for instance, in the channel, the longitudinal direction being directed preferably substantially perpendicularly to the plane of the outflow opening. Due to the distances in the distance interval being relatively small, a relatively large pressure regulating range is realized. Thus, also at a relatively high pressure in the channel, a sufficiently large pressure regulating range (about 10% of the pressure in the channel) can be achieved. The control of the control pin in the distance interval is preferably carried out with a relatively accurate pressure regulating mechanism, in view of the relatively small distances. The precise distance interval in which the control pin is operatively regulated depends on the viscosity of the fluid.

In the printing of fluids having a particularly high viscosity, work is done at an average relatively high pressure in the channel and so a relatively large regulating range is required. To achieve this, the distance from the end to the outflow opening should be relatively small to realize the above-mentioned relatively large pressure regulating range. In known systems that work with pressures up to 5 Bars [$\equiv 5 \cdot 10^5$ Pa], this distance is, for instance, in the order of 1.5 mm. For the pressure regulating mechanism according to the invention, therefore, this distance is preferably considerably smaller.

The pressure regulating mechanism can comprise a piezo element for driving the movable control pin. With the piezo element, an accurate control can be achieved. The piezo element is preferably insulated with a thermal screening (insulating ring) of optionally heated fluid, to ensure an accurate functioning of the pressure regulating mechanism (see also the Description of the Drawings). Because the end of the control pin has a relatively small surface area of, for instance, 10 mm$^2$, it is possible, with a relatively small driving force of up to, for instance, 100 N on the control pin, to effect a relatively large pressure variation of, for instance, 30 bars [$\equiv 30 \cdot 10^5$ Pa] and thereby to realize a sufficiently large pressure regulating range. The pressure regulating mechanism is therefore suitable in particular for application in the apparatus according to the invention.

An advanced embodiment is characterized in that a diameter of the outflow opening is in the interval of 20-100 μm. Preferably, the longitudinal direction of the control pin is directed transversely to the outflow opening.

According to a preferred embodiment, the apparatus is provided with a regulable heating element for heating (temperature range 15-700° C.) the viscous fluid in the channel. By regulating the temperature of the fluid, the fluid can acquire a particular viscosity for the purpose of processing (printing). This makes it possible to print viscous fluids such as different kinds of plastic and also metals (such as solder).

The invention further relates to a method for printing a fluid material using a continuous jet printing technique. The method according to the invention is characterized in that the pressure in at least a part of the channel upstream of the outflow opening is in the pressure interval of 15-600 bars [$\equiv 15 \cdot 10^5$ to $600 \cdot 10^5$ Pa]. In this method, the viscous substance at the time of flowing out through the outflow opening can have a viscosity which is in the viscosity interval of $150 \cdot 10^{-3}$ to $400 \cdot 10^{-3}$ Pa·s.

The invention will presently be further elucidated with reference to the drawing, in which.

Figure 1:
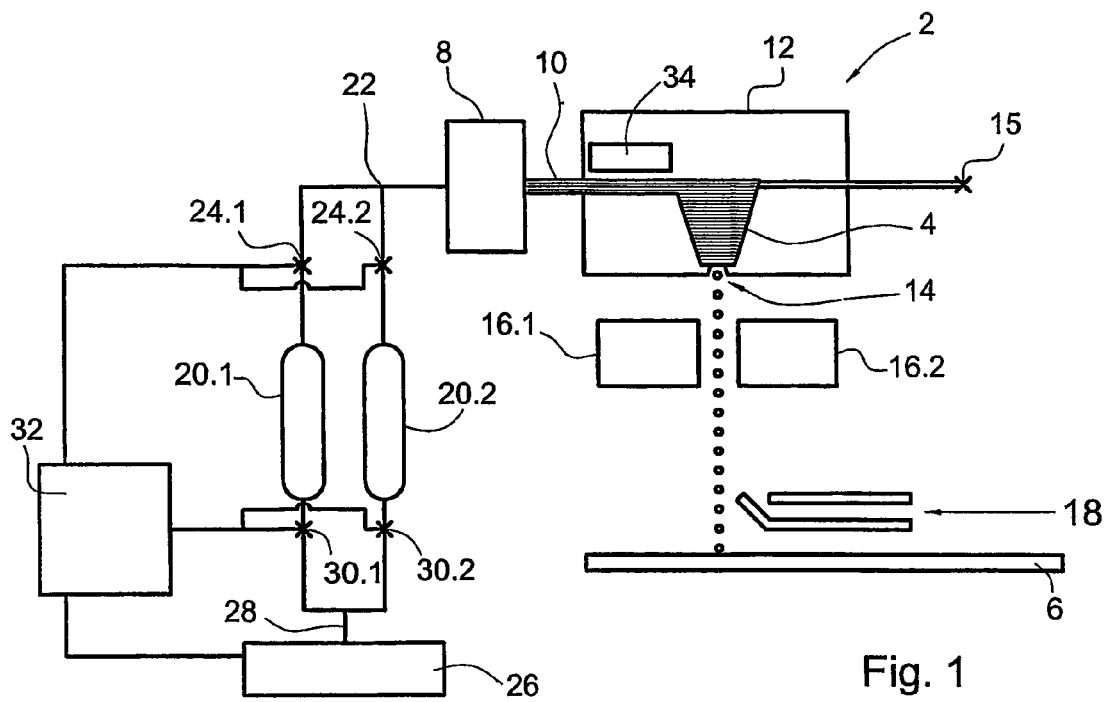
FIG. 1 is a schematic overview of an apparatus according to the invention.

FIG. 1 shows schematically an apparatus 2 for printing a fluid material 4 on a plate- or sheet-shaped material 6 by means of a continuous jet printing technique. The apparatus comprises a reservoir 8 for storing the fluid material 4 and a channel 10 connected with the reservoir 8. The channel 10 connects the reservoir 8 with the printhead 12. The channel in the printhead 12 is provided with at least one outflow opening 14 through which the fluid material 4 exits under pressure in the form of a jet breaking up into drops, in order for these drops, after being selectively deflected, or directed, to be printed on the material 6. A transverse dimension of the outflow opening 14 can be in the interval of 30-100 μm.

In this example, the channel 10 comprises a portion downstream of the outflow opening 14 which is provided with a cock 15. By opening the cock 15, the printhead 12 can be flushed with a flushing material/flushing ink which is present in the channel.

The apparatus 2 is a printer of the continuous jet-type, whereby a continuous stream of drops to be printed is formed, in contrast to a printer of the Drop-on-demand type where drops are delivered through the outflow opening only if the printhead has been activated to that effect. For the purpose of forming a jet breaking up into drops, the apparatus 2 is provided with a pressure regulating mechanism for varying the pressure of the material 4 upstream of the outflow opening.

The apparatus 2 in this example is provided with a directing system 16.1, 16.2 enabling the drops to be deflected in two directions for determining the print location of the drops on the material 6. To that end, the directing system 16.1, 16.2 is provided, for instance, with a charge electrode by means of which the drops can be provided with an electric charge. Also, the directing system 16.1, 16.2 may be provided with, for instance, a capacitor by means of which electrically charged drops can be deflected in their path. Further, the apparatus 2 may be provided with a collecting gutter 18 by which particular drops can be captured, so that these drops are not printed on the material 6.

The apparatus 2 is provided with pressure generating means for passing the material 4 under a predetermined pressure through the channel in the direction of the outflow opening 14. The pressure generating means are arranged to apply the predetermined pressure to the material 4 hydraulically and/or pneumatically. In this example, the pressure generating means comprise a gas source which in this example comprises two gas bottles 20.1, 20.2 which are filled, for instance, with nitrogen. The gas bottles 20.1, 20.2 are connected via a (gas) connection 22 with the reservoir 8. Optionally, in the (gas) connection between the gas bottles and the reservoir 8, a pressure regulating valve is included (not shown) for keeping the pressure constant. In use, the pressure in the gas bottles will be higher than the desired pressure that is regulated by means of a pressure regulating valve. When the pressure in one of the bottles falls below the desired pressure, a switch can be made to the other bottle. In a practical variant, the connection 22 terminates in an upper side of the reservoir 8, so that a gas pressure can be applied to a surface of the viscous fluid in the reservoir 8. The channel 10 for the transport of the viscous fluid 4 can be connected to the reservoir 8 on a bottom side thereof.

In the connection 22, cocks 24.1, 24.2 are included, by means of which it can be determined which gas bottle is or which gas bottles are in open communication with the reservoir 8. The cocks can also be designed as, or with, a pressure regulating valve. In that case, there is no open communication involved anymore. A gas bottle being in open communication with the reservoir 8 can provide the reservoir 8 with pressure. Under this pressure, viscous fluid 4 accommodated in the reservoir is forced through the channel 10 to the outflow opening 14 in the printhead 12. Next, the viscous fluid 4 is forced through the outflow opening 14 to the material 6.

The apparatus 2 according to FIG. 1 is further provided with a plunger pump 26 which, via a connection 28 including cocks 30.1, 30.2, is in communication with the gas bottles 20.1, 20.2. With the plunger pump 26, the gas bottles (if the respective cocks 30 are open) can be adjusted to a desired pressure. This pressure can be, for instance, in the interval of 20-300 bars [$\equiv 20\cdot 10^5$ to $300\cdot 10^5$ Pa]. While the apparatus (printhead 12) is in operation, the gas bottles 20.1, 20.2 can be alternately in communication with the reservoir 8. This means, for instance, that in a first phase the gas bottle 20.1, via connection 22 with an open cock 24.1, is in open communication with the reservoir 8. The cock 24.2 and the cock 30.1 are closed. The cock 30.2 can then be temporarily opened, so that the plunger pump 26 can adjust the gas bottle 20.2 to the required pressure via the connection 28, without thereby causing irregular pressure disturbances in, for instance, the channel 10. As soon as the pressure in the gas bottle 20.1 becomes too low for a proper operation of the apparatus 2, this gas bottle can be closed off from the channel 10 by closing the cock 24.1. The gas bottle 20.2 can take over the task from gas bottle 20.1, for which purpose the cock 24.2 is opened. Thus, the gas bottles can be utilized in such a way that the apparatus 2 can function continuously. In the example of FIG. 1, the apparatus is provided with an automatic control system 32 for operating the cocks 24.1, 24.2, 30.1, 30.2, the gas bottles 20.1, 20.2 and the plunger pump 26. Thus, an automatic and good cooperation of the various parts is obtained. The gas bottles serve, in use, to provide the channel with a particular pressure, while the flow rate of the gas flowing from the gas bottles can be relatively low. For that reason, among others, it is possible, without any objection, that the gas bottles 20.1, 20.2 are relatively small (or, in the case where the apparatus is designed with just one gas bottle, the gas bottle can be relatively small), so that the apparatus 2 can be made of relatively compact design.

The apparatus 2 is preferably provided with a heating element 34 for adjusting the viscous fluid to a desired temperature. By adjusting the temperature of the viscous fluid, the viscosity of the fluid can (to some extent) be (additionally) regulated. The heating element may be included in the printhead 12 in or near the channel 10.

Figure 2:
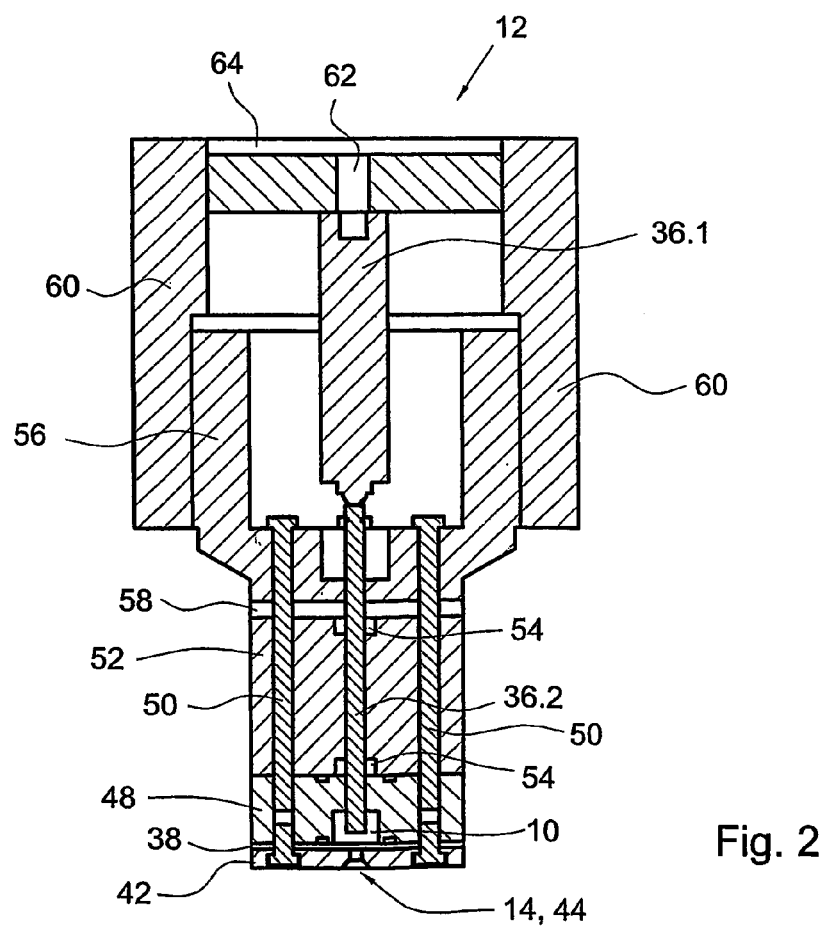
FIG. 2 is a schematic cross section of a printhead of an apparatus according to FIG. 1.

FIG. 2 shows a cross section of a printhead 12 which can be used in the apparatus 2 according to the invention. The printhead 12 comprises a pressure regulating mechanism for varying the pressure of the viscous fluid exiting through the outflow opening 14 in a predetermined, regular manner. In this example, the pressure regulating mechanism comprises a piezo element 36.1 and a movable control pin 36.2. The piezo element 36.1 is a regulating element by means of which the control pin 36.2 can be driven, allowing the control pin 36.2 to be moved in a longitudinal direction of the control pin 36.2 towards/away from the outflow opening 14, for varying the pressure adjacent the outflow opening 14. The control pin 36.2 is movable, such that an end 37 of the control pin 36.2 is displaceable relative to the outflow opening 14 in the nozzle plate 38 by a regulable distance which is in an interval distance of 15-500 µm (reference may be had to FIG. 3). For particular applications where a viscous fluid having a particularly high viscosity of, for instance, $300\cdot 10^{-3}$ Pa·s, is printed, an interval distance of 15-30 µm can be used.

Owing to the end 37 having a relatively small surface area, for instance 1-5 mm², it is possible, through relatively small driving forces generated by the element 36.1, via the end 37 of the control pin 36.2, to effect relatively large pressure variations adjacent the outflow opening 14. The driving force then amounts to, for instance, 250 N. By creating pressure variations in a regular manner via the driving force, a uniform distribution of the drops of the viscous fluid exiting through the outflow opening is obtained. As an indication of the size of the pressure regulating range, it may serve as an example that at an average pressure in the order of magnitude of 200 bars [$\equiv 200\cdot 10^5$ Pa] in the channel 10, the desired pressure regulating range is in the order of magnitude of about 40 bars [$\equiv 40\cdot 10^5$ Pa].

Figure 3:
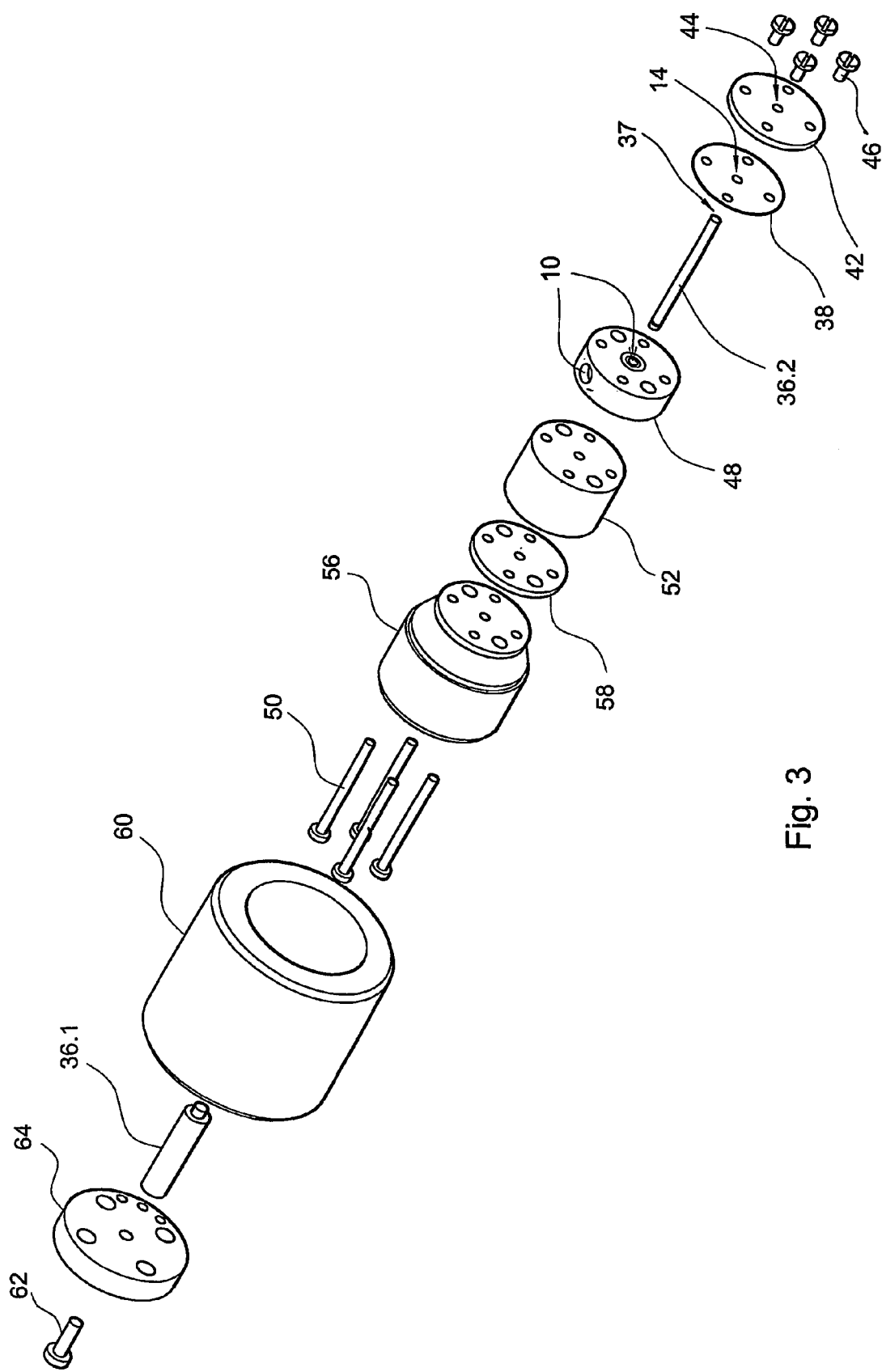
FIG. 3 is a schematic exploded perspective representation of the printhead according to FIG. 2.

The outflow opening 14 is included in a relatively thin nozzle plate 38 (reference may be had to FIG. 3). The nozzle plate 38 can be a plate manufactured from metal foil, of a thickness of 0.3 mm. The outflow opening 14 in the plate 38 has a diameter of 50 µm in this example.

The printhead 12 is further provided with a supporting plate 42 which supports the nozzle plate 38, so that it does not collapse under the high pressure in the channel 10 (see FIGS. 2, 3). The supporting plate is provided with an opening 44 which is situated opposite the outflow opening 14. The diameter of the opening 44 can be an order of magnitude greater than the diameter of the outflow opening 14. The supporting plate 42 can be attached with screws 46 to a first annular part 48 (FIG. 2). In this first cylinder part 48, the channel 10 is provided at least in part. Further, the cylinder part 48 is provided with a central recess through which the control pin 36.2 can be passed.

The first cylinder part 48 can be attached through screws 50 to a second cylinder part 52 and a third cylinder part 56. The second cylinder part 52 is provided with flexible sealing rings 54 (FIG. 2) which clamp inter alia against the control pin 36.2. Preferably, the sealing rings 54 can follow the movements of the control pin 36.2 by mechanical deformation without the contact surfaces of the sealing rings 54 with the control pin 36.2 moving relative to the control pin 36.2. With the sealing rings 54, a leak-free sealing is obtained, so that at least almost no viscous fluid can leak from the channel 10.

Situated between the second cylinder part 52 and the third cylinder part 56 is a thermal screening or insulating ring 58. This insulating ring 58 may be designed as a zirconium oxide plate. The low heat conduction of zirconium oxide yields a very favorable thermal screening of the piezo element from the optionally heated viscous fluid. Such a thermal screening of the piezo element is specifically relevant at relatively high temperatures of the viscous fluid. When the viscous fluid 4 to be printed has been heated by the heating element 34 to give the fluid a particular viscosity, the insulating ring 58 can prevent disturbance of the functioning of the pressure regulating mechanism due to the operation of the piezo element 36.1 being adversely affected. The heating element may be accommodated in the first cylinder part 48. The piezo element 36.1 can optionally be provided with an active cooling, such as a water cooling.

The third cylinder part 56 can be attached to a shell-shaped body 60 in which inter alia the piezo element 36.1 can be accommodated (see FIG. 2). The piezo element is then situated between a cover plate 64 attached to the shell-shaped body 60 with a screw 62 and the control pin 36.2. The control pin 36.2 has been passed through the central openings of, respectively, the first cylinder part 48, the second cylinder part 52, the insulating ring 58, and the third cylinder part 56.

It will be clear from the foregoing that the predetermined pressure which is hydraulically and/or pneumatically applied to the fluid material 4 in the channel, having a viscosity of 150 mPa·s upon exit and at printing temperature, can be between 15 and 600 bars. It is also possible, however, that the predetermined pressure is between 100 and 600 bars. In that case, when using an average nozzle size, a material having a viscosity of 150 mPa·s upon exit and at printing temperature can be printed continuously with an apparatus according to the invention. It is also possible that the predetermined pressure is between 200 and 600 bars. In that case, when using an average nozzle size, a material having a viscosity of 300-400 mPa·s upon exit and at printing temperature can be printed continuously with an apparatus according to the invention. Furthermore, it is possible that the predetermined pressure is between 300 and 600 bars. This permits, using an average nozzle size, the continuous printing of a material having a viscosity of 500-600 mPa·s upon exit and at printing temperature. Also, the predetermined pressure may be between 400 and 600 bars for continuously printing, using an average nozzle size, for instance a material having a viscosity of 700-800 mPa·s upon exit and at printing temperature.

The invention has been described on the basis of an exemplary embodiment, but is not in any way limited to this embodiment. Diverse variations also falling within the scope of the invention are possible. To be considered, for instance, are alternative pressure generating means for the gas bottle, also capable of generating a relatively high and at the same time constant pressure. Further, in the third cylinder part, a spring may be included which pushes the control pin with a bias into a starting position against a stop.

The invention claimed is:

1. An apparatus for printing a fluid material by means of a continuous jet printing technique, comprising a reservoir for storing the material, a channel connected with the reservoir, which is provided with at least one outflow opening from which, in use, flows a jet of the material breaking up into drops, and a pressure regulating mechanism for varying the pressure of the material upstream of the outflow opening for the purpose of obtaining the jet breaking up into drops, the apparatus being further provided with pressure generating means for passing the material under a predetermined pressure through the channel in the direction of the outflow opening, characterized in that the pressure generating means are arranged for applying the predetermined pressure to the material in the channel hydraulically and/or pneumatically;

wherein the pressure regulating mechanism comprises a movable control pin, which control pin can be moved in a longitudinal direction towards/away from the outflow opening; and wherein an end of the control pin can be placed at a predetermined distance of 15-500 μm from the outflow opening, for varying the pressure adjacent the outflow opening by means of vibration of the control pin.

2. An apparatus according to claim 1, characterized in that the pressure generating means comprise a gas source coupled to the reservoir and/or the channel via a gas connection.

3. An apparatus according to claim 2, characterized in that the gas source comprises a gas bottle.

4. An apparatus according to claim 3, characterized in that the apparatus is further provided with a plunger pump connected to the gas bottle via a gas connection with a cock, for pressurizing the gas bottle, and that the gas bottle is connected to the reservoir and/or the channel via a cock.

5. An apparatus according to claim 4, characterized in that the gas source comprises a second gas bottle coupled to the reservoir and/or the channel via a gas connection with a cock.

6. An apparatus according to claim 1, characterized in that the predetermined pressure is a pressure between 15 and 600 bars.

7. An apparatus according to claim 6, characterized in that the predetermined pressure is a pressure between 100 and 600 bars.

8. An apparatus according to claim 7, characterized in that the predetermined pressure is a pressure between 200 and 600 bars.

9. An apparatus according to claim 8, characterized in that the predetermined pressure is a pressure between 300 and 600 bars.

10. An apparatus according to claim 9, characterized in that the predetermined pressure is a pressure between 400 and 600 bars.

11. An apparatus according to claim 1, characterized in that the movable control pin is situated in the channel, while the longitudinal direction of the control pin is directed substantially perpendicularly to the plane of the outflow opening, and the control pin is laterally supported by a bearing including O-rings.

12. An apparatus according to claim 1, characterized in that the pressure regulating mechanism comprises a piezo element for driving the control pin.

13. An apparatus according to claim 12, characterized in that the apparatus is provided with a thermal screening element for thermally screening said piezo element from the material in the channel.

14. An apparatus according to claim 1, characterized in that a diameter of the outflow opening is in the interval of 20-100 μm.

15. An apparatus according to claim 1, characterized in that the apparatus is provided with a heating element, which may or may not be regulable, for heating the material in the channel.

16. An apparatus according to claim 15, characterized in that the heating element is arranged for bringing the material to a temperature which is in the interval of 15-700° C.

17. An apparatus according to claim 16, characterized in that the heating element is arranged to bring the material to a temperature which is in the interval of 150-300° C.

18. A method for printing a fluid material using a continuous jet printing technique, wherein the material is passed under pressure from a reservoir through a channel to at least one outflow opening of the channel, after which the material is passed through the outflow opening, characterized in that the pressure in at least a part of the channel upstream of the outflow opening is in the interval of 15-600 bars [approximately $15 \cdot 10^5$ to $600 \cdot 10^5$ Pa];

wherein a pressure regulating mechanism comprises a movable control pin, which control pin can be moved in a longitudinal direction towards/away from the outflow opening; and wherein an end of the control pin can be placed at a predetermined distance of 15-500 μm from the outflow opening, for varying the pressure adjacent the outflow opening by means of vibration of the control pin.

19. A method according to claim 18, characterized in that the material at the time of flowing out through the outflow opening has a viscosity which is in the interval of $150 \cdot 10^{-3}$ to $400 \cdot 10^{-3}$ Pa·s.

20. An apparatus for printing a fluid material by means of a continuous jet printing technique, comprising a reservoir for storing the material, a channel connected with the reservoir, which is provided with at least one outflow opening from which, in use, flows a jet of the material breaking up into drops, and a pressure regulating mechanism for varying the pressure of the material upstream of the outflow opening for the purpose of obtaining the jet breaking up into drops, the apparatus being further provided with pressure generating means for passing the material under a predetermined pressure through the channel in the direction of the outflow opening, characterized in that the pressure generating means are arranged for applying the predetermined pressure to the material in the channel hydraulically and/or pneumatically; wherein the apparatus is further provided with a gas bottle a plunger pump connected to the gas bottle via a gas connection with a cock, for pressurizing the gas bottle, and that the gas bottle is connected to the reservoir and/or the channel via a cock.

21. An apparatus according to claim 20, characterized in that the gas source comprises a second gas bottle coupled to the reservoir and/or the channel via a gas connection with a cock.

* * * * *